Dec. 16, 1924.
H. L. MERRICK
WEIGHING MECHANISM
Filed Feb. 28, 1921
1,519,383
2 Sheets-Sheet 1
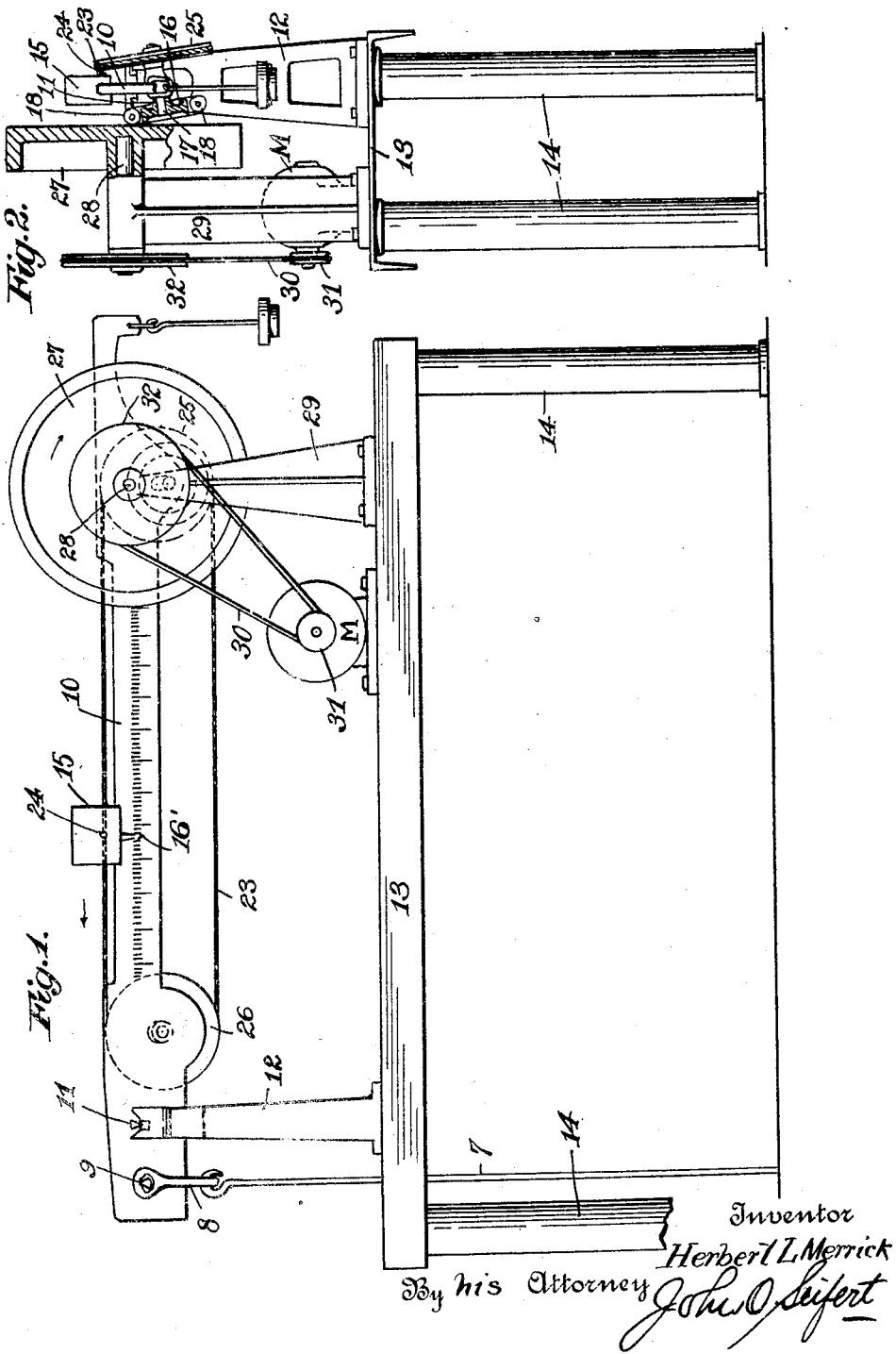
Inventor
Herbert L. Merrick
By his Attorney
John O. Seifert Dec. 16, 1924.

H. L. MERRICK

WEIGHING MECHANISM

Filed Feb. 28, 1921   2 Sheets-Sheet 2

1,519,383

Inventor
Herbert L. Merrick
By his Attorney

Patented Dec. 16, 1924.

1,519,383

UNITED STATES PATENT OFFICE.

HERBERT L. MERRICK, OF PASSAIC, NEW JERSEY.

WEIGHING MECHANISM.

Application filed February 28, 1921. Serial No. 448,404.

*To all whom it may concern:*

Be it known that I, HERBERT L. MERRICK, a citizen of the United States, and a resident of Passaic, in the county of Passaic and State of New Jersey, have invented certain new and useful Improvements in Weighing Mechanism, of which the following is a specification.

This invention relates to weighing mechanism, particularly of the type employing a steelyard or scale beam arranged with means to support a load therefrom and having a poise weight adjustably mounted thereon to counterbalance a load supported by the beam, and it is the object of the invention to provide improved means controlled by the deflection of the scale beam to automatically adjust the poise weight to bring the beam into equilibrium to counterbalance a load supported thereby.

In carrying out the invention I provide a pivoted scale beam arranged to support a load and having a poise weight adjustably mounted thereon, said beam carrying a rotatable friction member having connection with the poise weight to adjust the latter on the beam through the movement of said member, said member being arranged to contact with a rotatable friction face and the positioning of said member relative to said face and the direction of movement thereof being controlled by the deflection of the scale beam.

In the drawings accompanying and forming a part of this specification, Figure 1 is a front elevation of weighing mechanism showing an embodiment of my invention.

Figure 2 is an end elevation, partly in section, looking at the right of Figure 1.

Similar characters of reference designate like parts throughout the different views of the drawings.

Figure 3:
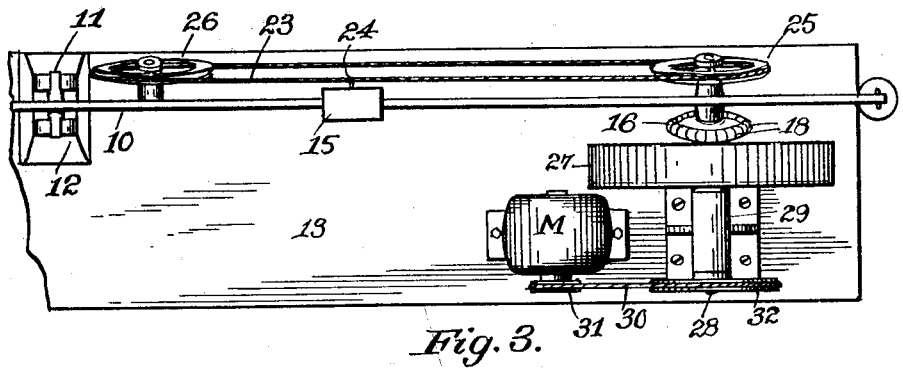
Figure 3 is a plan view.
Figure 4:
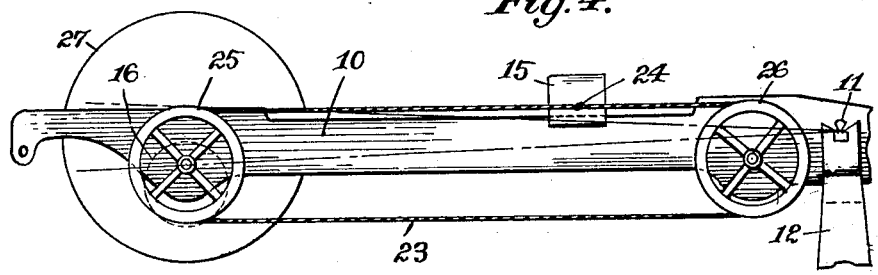
Figure 4 is a view looking at the right of Figure 2 to show the means to adjust the poise weight along the beam.

I have shown an embodiment of my invention in the drawings in connection with a platform scale in which the load receiving platform (not shown) is connected by a rod 7 to a shackle 8 having eyes for the engagement of knife edge pivots 9 projecting laterally from opposite sides at one end of a steelyard or scale beam 10 fulcrumed or pivotally supported intermediate its ends by knife edge pivots 11 projecting from opposite sides of the beam engaging upon bearings in a standard 12 mounted upon a shelf 13 supported upon columns 14. The end of the beam opposite to its connection with the load receiving platform is arranged with graduations and has a poise weight 15 adjustably mounted thereon arranged with a pointer 16′ to co-operate with the graduations to indicate the weight of a load weighed.

Figure 6:
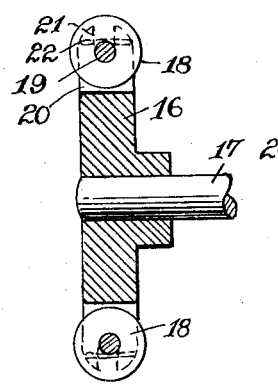
Figure 6 is a sectional view taken substantially on the line 6—6 of Figure 5.
Figure 5:
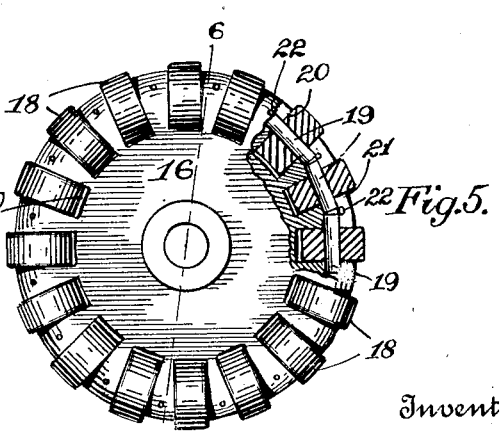
Figure 5 is an enlarged elevational view, partly in section, looking at the front of the friction member carried by the beam.

To automatically adjust the poise weight along the beam when the beam has been deflected from the horizontal or moved out of equilibrium by the placing of a load upon the load receiver or platform to counterbalance and weigh such load, or again bring the beam into equilibrium when the scale beam has been relieved of the load, a friction member is rotatably carried by the beam adjacent at the end opposite to which the load receiving means is connected thereto, this member being in a form of a disk 16 fixed to one end of a shaft 17 rotatably carried by the beam with the ends projecting from opposite sides thereof. This disk carries a series of anti-friction rollers 18 disposed around the periphery of the disk and mounted on fixed shafts 19 in recesses 20 in the peripheral portion of the disk with the periphery of the rollers to extend beyond the sides and periphery of the disk and to be independently rotatable about an axis extending circumferentially of the disk (Figures 5 and 6). The roller shafts 19 are supported at either end in grooves 21 in the opposite walls of the recesses 20 and releasably retained therein by pins or screws 22 extending transversely of said recesses 21 above the shafts. The rollers 18 are preferably tapered toward each end so as to substantially coincide with the circumference of the disk.

The disk is operatively connected to the poise weight to adjust the latter upon the beam through the movement of the disk by a band or cable 23 secured at opposite ends to the poise weight, as at 24, and passing around a grooved pulley 25 fixed to the shaft 17 at the side of the beam opposite to the disk 16 and a wheel 26 rotatably carried by the beam adjacent its fulcrumed support 11.

It will be obvious that as the disk 16 is rotated the poise weight will be moved along the beam in one direction by the movement of the disk in one direction and in an opposite direction by the reverse rotation of the disk.

To impart rotative movement to the disk 16 a friction disk 27 is fixed to a shaft 28 journalled in a standard 29 mounted upon the shelf 13 to rotate on an axis parallel with the axis of the pivotal support 11 of the beam and in opposite relation to the friction rollers 18 carried by the disk 16. The friction disk 27 is continuously rotated in the direction indicated by the arrow from a suitable source of power and shown as an electric motor M mounted upon the shelf 13 connected to the friction disk by a belt 30 passing around a pulley 31 on the motor shaft and a pulley 32 fixed to the shaft 28 of the disk.

As stated the friction disk 27 is mounted in opposed relation to the friction roller carrying disk 16. The roller carrying disk 16 is carried by the beam to rotate on an axis oblique to the axis of the friction disk 27 and arranged so that in the normal no-load position of equilibrium of the beam the roller 18 at the uppermost peripheral portion of the disk 16 will contact with the friction disk 27 at a point coincident with the axis of friction disk 27. In this position of the disk 16 there will be no tendency of the friction disk 27 to rotate disk 16. To prevent the disk 27 wearing flat surfaces on the rollers 18 the central portion of the face of disk 27 can be depressed so that there will be no contact between disk 27 and rollers 18 until beam moves slightly from its position of equilibrium. As a load is applied to the beam the end of the beam opposite its connection with the load supporting means and upon which the roller carrying disk is mounted is deflected or moved upward thereby moving said disk 16 in a direction transverse to the face of the friction disk 27 and to contact therewith above the axis of rotation thereof. In this position of the disks a force is applied to a roller 18 in contact with the friction disk perpendicular to the plane of rotation of said roller and a bodily movement thereof across the face of the friction disk occurs and imparts a rotative movement to the disk 16 and the rollers successively brought into and moved out of contact with the friction disk 27, the rotative movement of disk 16 through its connection with the poise weight moving the latter outward on the beam. As the poise weight approaches the position to bring the beam into equilibrium the roller carrying disk 16 is moved in a direction radial of and toward the axis of the friction disk 27 and thereby gradually retarding the rotative movement of the disk 16 with a consequent retardation in the velocity of the movement of the poise weight upon the beam, and the rollers carried by the disk 16 are brought into position to contact with the friction disk 27 substantially axially thereof by moving the poise weight to position of perfect balance on the beam to bring the latter into equilibrium with the result that the poise weight will not overrun its correct position for bringing the beam into equilibrium. As the load is removed from the scale beam, due to the forward position of the poise weight, the forward end of the scale beam is deflected to incline downward from the horizontal and the roller carrying disk 16 will be moved to position a roller carried thereby to contact with the friction disk 27 below the axis of the latter and reverse movement will be imparted to the roller carrying disk 16 and the poise weight adjusted in reverse direction to that hereinbefore described when a load is applied to the scale beam until the beam is again restored to initial position of equilibrium and in position to weigh another load.

It will be noted that the poise weight is adjusted on the beam to counterbalance a load being weighed in a manner similar to that as in ordinary hand weighing, but that the poise weight is automatically moved to correct counterbalancing position, and that when the load is removed from the scale beam the poise weight is again automatically returned to initial no-load position.

Having thus described my invention I claim:

1. In weighing mechanism, the combination with a weighing beam arranged to support a load therefrom, of a poise weight movable upon the beam; a member rotatably carried by the beam connected to the poise weight; and means in continuous friction engagement with said rotatable member and coacting therewith when the beam is moved out of equilibrium to adjust the poise weight along the beam.

2. In weighing mechanism, the combination with a pivotally supported weighing beam, of a poise weight movable along the beam, a rotatable friction member carried by the beam operatively connected to the poise weight to move the latter along the beam during the rotative movement of said member; and a rotatable disk with which said member frictionally co-acts when the beam is in equilibrium to hold the poise weight against movement and when the beam is moved out of equilibrium to move the poise weight along the beam to a point of perfect balance and bring the beam into equilibrium.

3. In weighing mechanism, the combination with a load supporting scale beam, of a poise weight adjustably mounted upon the beam; an actuator to move the poise weight along the beam; and means continuously in contact with the actuator and frictionally coacting with the actuator when the beam is moved out of equilibrium to actuate the same to adjust the poise weight along the beam to bring the latter into equilibrium.

4. In weighing mechanism, the combination with a scale beam, of a poise weight adjustably mounted upon the beam; a friction member and wheel rotatably carried by the beam; a connection between said friction member, wheel and counterpoise; and a friction disk with which the friction member co-acts when the beam is moved out of equilibrium to adjust the poise weight along the beam to bring the latter into equilibrium.

5. In weighing mechanism, the combination with a scale beam, of a poise weight adjustably mounted upon the beam; a friction member rotatably carried by the beam; a wheel rotatable with said member; a second wheel rotatably carried by the beam; a cable passing around said wheels and connected to the poise weight, and a disk to frictionally contact with and actuate the friction member and connected wheels when the beam is moved out of equilibrium for the purpose specified.

6. In weighing mechanism, the combination with a pivotally supported scale beam, of a friction disk supported to rotate on an axis in a plane parallel with the pivotal support of the scale beam; a poise weight adjustable on the beam; a friction member carried by the beam to rotate in a plane at an angle to the face of the friction disk and with a peripheral portion adapted to have contact with the disk in line with the axis of the disk when the beam is in equilibrium, and to contact with the disk at one side of the axis thereof when the beam is moved out of equilibrium for the purpose specified.

7. In weighing mechanism, the combination with a pivotally supported scale beam, of a friction disk supported independent of the beam; a poise weight adjustable on the beam; a friction member rotatably carried by the beam with a peripheral portion adapted to have contact with the disk in line with the axis of the disk when the beam is in equilibrium, and to contact with the disk at one side of the axis thereof and have movement imparted thereto in one direction when the beam is moved to overload position and to contact at the opposite side of the axis of the disk and have movement imparted thereto in opposite direction when the beam is moved to underload position; and means to connect said member to the poise weight to effect adjustment thereof on the beam through the movement of said member.

8. In weighing mechanism, the combination with a pivotally supported scale beam, of a friction disk supported independently of the beam; a poise weight adjustable on the beam; and a disk rotatably carried by the beam and operatively connected to the poise weight to adjust the latter on the beam through the movement of the disk, said disk carrying a series of rollers to independently rotate about an axis extending circumferentially of the disk, and the disk arranged with a roller to contact with the friction disk in line with the axis of the friction disk when the beam is in equilibrium and to contact with the friction disk at either side of the axis thereof in accordance with the deflection of the beam for the purpose specified.

9. In weighing mechanism, the combination with a pivotally supported scale beam, of a poise weight adjustable on the beam; a friction member rotatably carried by the beam and having connection with the poise weight to adjust the latter on the beam through the movement of the friction member; and a friction disk to co-act with said friction member to frictionally rotate said member in a direction by and in accordance with the deflection of the scale beam to adjust the poise weight to bring the beam into equilibrium.

10. In weighing mechanism, the combination with a pivotally supported scale beam arranged to support a load at one side of its pivotal support, of a poise weight adjustably mounted on the beam at the opposite side of its pivotal support; a friction member rotatably carried on the beam; means to connect the poise weight to said member to adjust said weight upon the beam through the movement of the friction member; and a friction disk supported independent of the beam to rotate on an axis parallel with the axis of the pivotal support of the scale beam and co-act with the friction member when the beam is moved out of equilibrium to transmit movement to said friction member for the purpose specified.

11. In weighing mechanism, the combination with a pivotally supported scale beam arranged to support a load at one side of its pivotal support, of a poise weight adjustably mounted on the beam; a friction disk supported independently of the beam; a friction member carried by the beam to rotate in a plane oblique to the axis of the disk and to have frictional contact with the disk axially thereof with the beam in position of equilibrium without imparting rotative movement to said member, and to engage with the disk at either side of the axis thereof by and in accordance with the movement of the beam out of equilibrium to permit rotative movement of said member in opposite directions; and means to connect the friction member to the poise weight.

12. In weighing mechanism, the combination with a pivotally supported scale beam arranged to support a load at one side of its pivotal support, of a poise weight adjustably mounted on the beam; a friction disk supported independent of the beam to rotate on an axis parallel with the axis of the beam support; a disk carrying a series of rollers to independently rotate about an axis extending circumferentially of said disk, said disk being rotatably carried on the beam and opposite the friction disk to rotate on an axis oblique to the axis of the friction disk with the rollers to contact with the face of the disk in line with the axis of the disk when the beam is in equilibrium and to contact with the friction disk at either side of the axis thereof in accordance with the deflection of the beam; a wheel rotatable with the disk carried by the beam; a second wheel rotatably carried by the beam; and a cable to pass around said wheels and connected to the poise weight for the purpose specified.

Signed at New York city, in the county of New York and State of New York this 24th day of January, 1921.

HERBERT L. MERRICK.